US012623335B2

(12) United States Patent
Fan et al.

(10) Patent No.: US 12,623,335 B2
(45) Date of Patent: May 12, 2026

(54) TOOLBOX WITH A SIDE HANGING FUNCTION

(71) Applicant: Yantai Greenery Tools Co., Ltd., Yantai (CN)

(72) Inventors: Changlei Fan, Yantai (CN); Bo Yu, Yantai (CN)

(73) Assignee: Yantai Greenery Tools Co., Ltd., Yantai (CN)

( * ) Notice: Subject to any disclaimer, the term of this patent is extended or adjusted under 35 U.S.C. 154(b) by 53 days.

(21) Appl. No.: 18/673,421

(22) Filed: May 24, 2024

(65) Prior Publication Data

US 2024/0416500 A1 Dec. 19, 2024

(30) Foreign Application Priority Data

Jun. 17, 2023 (CN) ......................... 202310719997.5

(51) Int. Cl.
*B25H 3/02* (2006.01)
*B65D 21/02* (2006.01)

(52) U.S. Cl.
CPC ........... *B25H 3/02* (2013.01); *B65D 21/0201* (2013.01); *B65D 21/0204* (2013.01)

(58) Field of Classification Search
CPC .... B25H 3/027; B25H 3/026; B65D 21/0201; B65D 21/0204; B65D 25/20
USPC ................................ 206/373; 220/23.2, 4, 6
See application file for complete search history.

(56) References Cited

U.S. PATENT DOCUMENTS

| | | | | |
|---|---|---|---|---|
| 4,465,189 | A * | 8/1984 | Molzan | B65D 81/24 206/811 |
| 2002/0117947 | A1 | 8/2002 | Cheng | |
| 2004/0134818 | A1 * | 7/2004 | Cunningham | B25H 3/023 206/373 |
| 2005/0199522 | A1 | 9/2005 | Hu | |
| 2018/0186547 | A1 * | 7/2018 | Morine | A47G 23/02 |

FOREIGN PATENT DOCUMENTS

| | | | |
|---|---|---|---|
| CN | 102248523 | A | 11/2011 |

* cited by examiner

*Primary Examiner* — Chun Hoi Cheung
*Assistant Examiner* — Sanjidul Islam

(57) ABSTRACT

A toolbox with a side hanging function is provided. The toolbox with a side hanging function includes a box body and a box cover, a side hanging groove being defined on a side wall of the box body; an elastic jamming tongue being provided on an inner side of the side hanging groove; and the elastic jamming tongue being matched to the side hanging groove; and wherein the elastic jamming tongue being connected to a side wall of the box body. The present use the side wall of the box body as a new space for storing items, and provides side hanging groove and elastic jamming tongue on the side wall, the side hanging groove is used to hang items, the elastic jamming tongue is used to fix and anti detachment. The toolbox with a side hanging function has multiple functions and has wide application prospects.

1 Claim, 4 Drawing Sheets

TOOLBOX WITH A SIDE HANGING FUNCTION

CROSS-REFERENCE

This application claims foreign priority of Chinese Patent Application No. 202310719997.5, filed on Jun. 17, 2023 in the China National Intellectual Property Administration, the disclosures of all of which are hereby incorporated by reference.

TECHNICAL FIELD

The present disclosure relates to the technical field of toolbox, in particular to a toolbox with a side hanging function, which is suitable for storage of various tools and other articles in daily life.

BACKGROUND

Toolbox is used for storage of various tools. With the rapid development of modern industry, there are more and more new and special tools, and the environment and requirements of construction operations are also diversified, so the specifications of the toolbox are constantly updated and iterated.

In order to meet user requirements, in addition to the storage function, it has also developed a variety of functions, such as charging, multimedia, and display stand. No matter what functions are equipped, all involve the proper allocation of storage space of the toolbox. The existing technology is that, divide the internal space of the tool box into multiple grids or compartments, set composite layer on the box cover or the box wall, and so on. The disadvantage is that the structure of each lattice layer or sandwich layer on the box is already fixed after the toolbox is produced, leading to a limited storage function, and it is impossible to accommodate additional tools, thus the additional tools can only use additional bags for storage and carrying, not only the trouble, but also easy to lose items, affecting the construction operations.

SUMMARY

Toolbox is used for storage of various tools. With the rapid development of modern industry, there are more and more new and special tools, and the environment and requirements of construction operations are also diversified, so the specifications of the toolbox are constantly updated and iterated.

The present disclosure provides a toolbox with a side hanging function, to solve the technical problems that the existing toolboxes are limited in storage function, and to extend the usage of toolbox and increase storage space.

The technical solutions of the present disclosure are as follows:

- a toolbox with a side hanging function, includes a box body and a box cover, a side hanging groove being defined on a side wall of the box body; an elastic jamming tongue being provided on an inner side of the side hanging groove; and the elastic jamming tongue being matched to the side hanging groove; and the elastic jamming tongue being connected to a side wall of the box body.

In another embodiment, the side hanging groove is located on the side wall of an upper edge of the box body; and the elastic jamming tongue is correspondingly connected to the side wall of the upper edge of the box body; and an anti-detachment T-shaped bar and an anti-deformation T-shaped bar are provided on the box cover; and the anti-detachment T-shaped bar is corresponded to the side hanging groove, and the anti-deformation T-shaped bar is corresponded to the elastic jamming tongue.

The present disclosure takes advantages of the side wall of the toolbox as a new space for storing items, and the side hanging groove and elastic jamming tongue are set on the side wall of the toolbox. The side hanging groove can directly hang items or hang items with removable storage pendant. The role of the elastic jamming tongue is to assist fixation and prevent falling off.

To explain, for the prior arts, some existing toolboxes also provided similar hook and loop structure on the sidewall, but the hook and loop structure are a single hoop structure or “pin hole & metal ring” structure. When hanging items the single hoop structure is easy to fall off. The “pin hole & metal ring” structure molded protruding pin hole structure first, and then installed the pin hole in the metal ring, thus reusing the metal ring hanging items. The “pin hole & metal ring” structure is that the pin hole area, force point and load bearing are small, so the “pin hole & metal ring” structure is weak. the additional metal ring function is limited and easy to damage.

Compared with the above existing technology there are some differences: firstly, the structure is completely different; secondly, the structure of side hanging slot and elastic jamming tongue is not only bear big weight, but also not easy to lose items; thirdly, the side hanging slot structure and the removable storage pendant can be formed standard matching, and is capable of hanging a variety of special tools, and is very fast and convenient.

The structure of the present disclosure is simple and novel, which effectively increases the storage space of the toolbox, and can hang various special tools at will, which is easy to use, and has broad market application prospects.

LABELS AND DESCRIPTION

- 1 box body, 2 box cover, 3 side hanging groove, 4 elastic jamming tongue, 5 anti-detachment T-shaped bar, 6 anti-deformation T-shaped bar, 7 removable storage pendant.

DETAILED DESCRIPTION OF THE EMBODIMENTS

Figure 1:
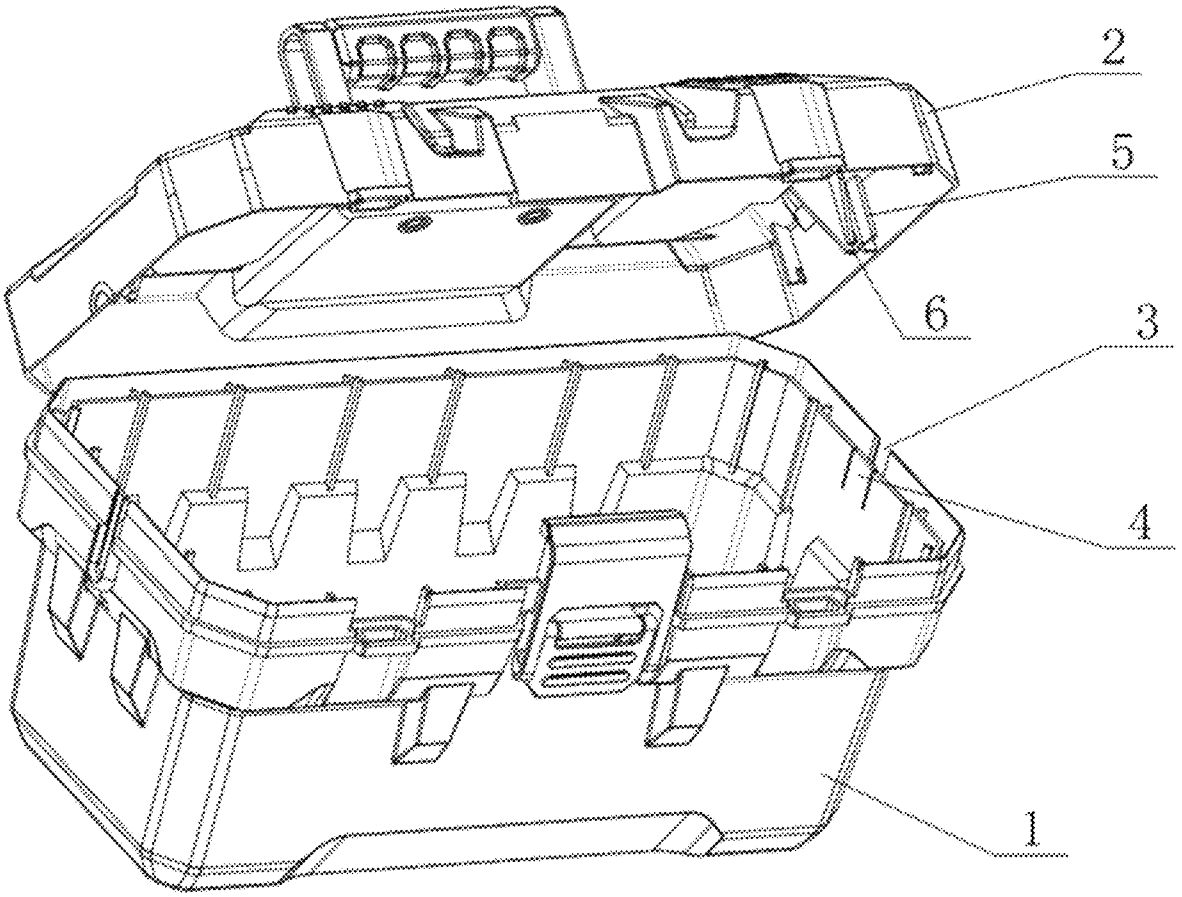
FIG. 1 is a schematic structural diagram of a toolbox with a side hanging function according to an embodiment of the present disclosure.
Figure 2:
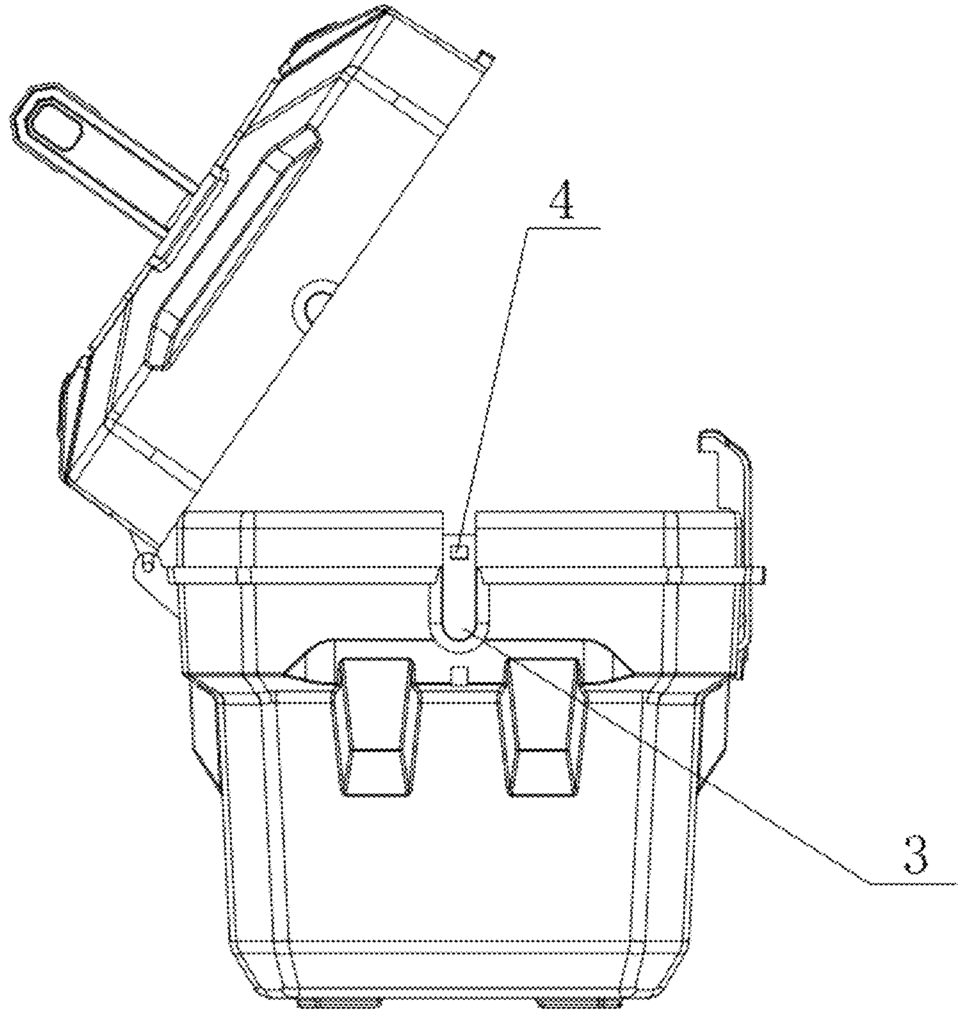
FIG. 2 is a side view of the toolbox with the side hanging function of FIG. 1.
Figure 3:
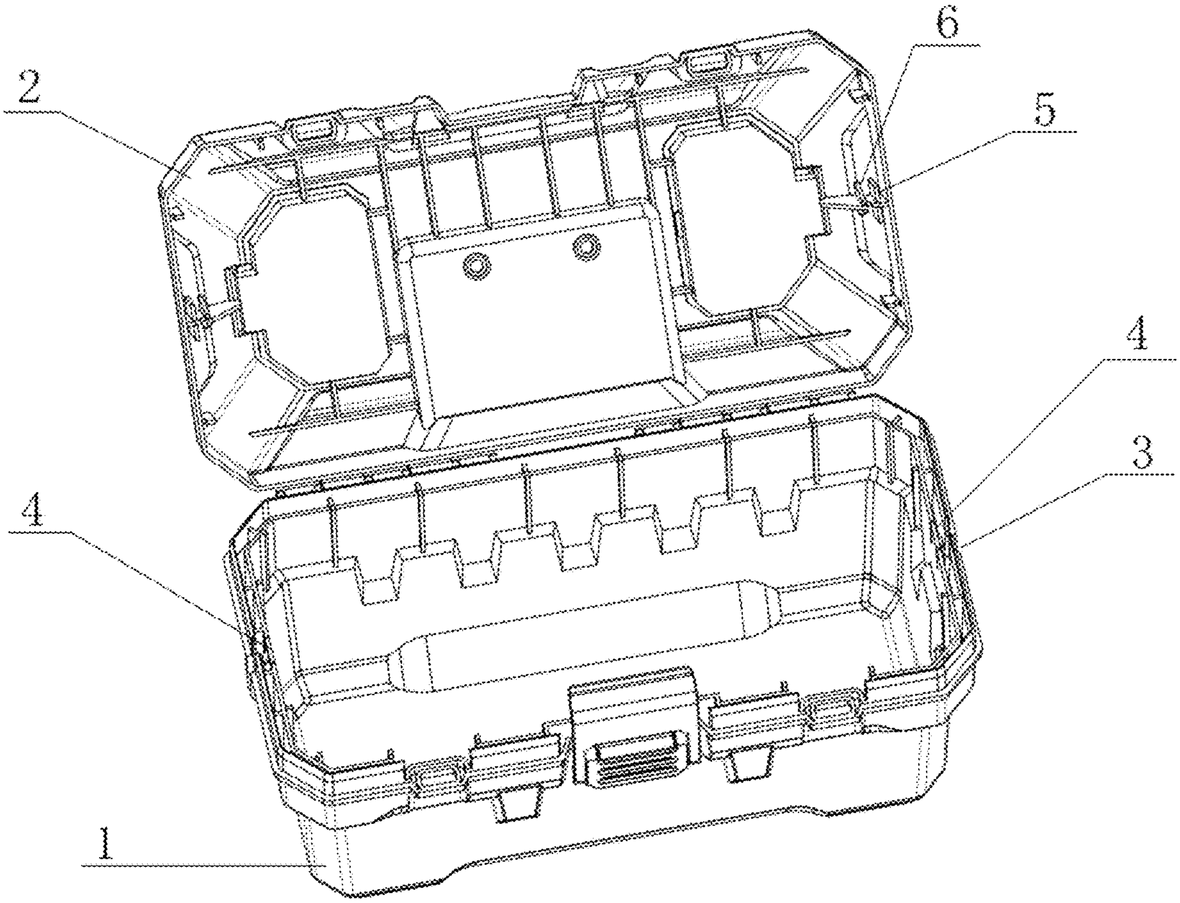
FIG. 3 is another schematic structural diagram of the toolbox with the side hanging function of FIG. 1 with the box cover completely opened.

Please refer to FIGS. 1-3, a toolbox with a side hanging function includes a box body 1 and a box cover 2, two sides of the box body are provided a U-shaped side hanging groove 3, respectively. The U-shaped side hanging groove 3 locates on the side of an upper edge of the box body 1. An elastic jamming tongue 4 is provided on an inner side of the side hanging groove 3, and the elastic jamming tongue 4 is connected to the side wall of the box body 1. During a process of making the toolbox with the side hanging function, adopting a connector, such as a screw or a rivet, to connect the elastic jamming tongue 4 with the side of the box body 1. In other embodiments, the elastic jamming tongue 4 and the elastic jamming tongue 4 are made by a integrated molding process, and form a integrated structure.

Please refer to FIG. 2, the side of the upper edge of the box body 1 can be designed as a double layer structure, an inner layer and an outer layer, and the U-shaped side hanging groove 3 locates on an side wall of the outer layer. The elastic jamming tongue 4 locates on the correspond side wall of the inner layer. And the double layer structure can be produced by mould pressing technology, which is a common techniques.

Please refer to FIG. 3, an anti-detachment T-shaped bar 5 and an anti-deformation T-shaped bar 6 are provided on the box cover 2, and the anti-detachment T-shaped bar 5 is corresponded to the side hanging groove 3, and the anti-deformation T-shaped bar 6 is corresponded to the elastic jamming tongue 4.

This disclosure further provides an application method of the toolbox with the side hanging function.

Figure 4:
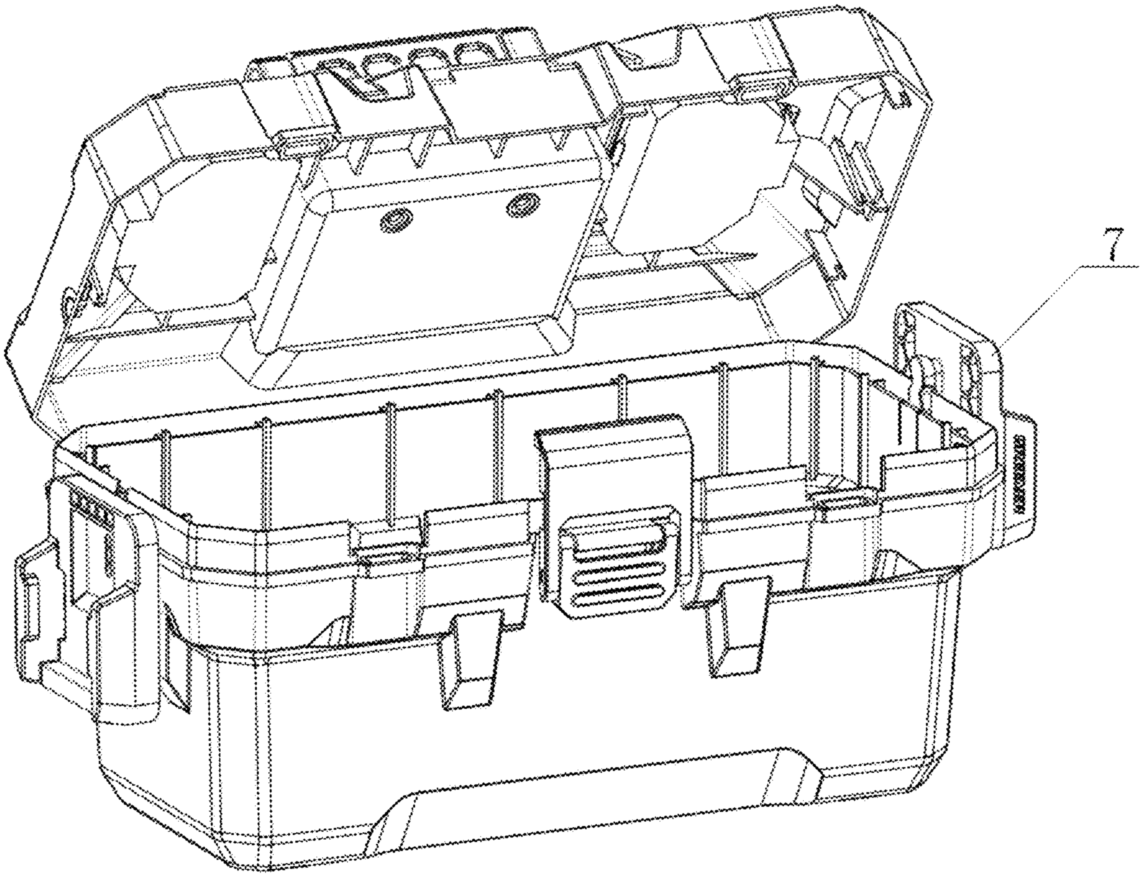
FIG. 4 is another schematic structural diagram of the toolbox with the side hanging function of FIG. 1 with a removable storage pendant hanging on a side wall.
Figure 5:
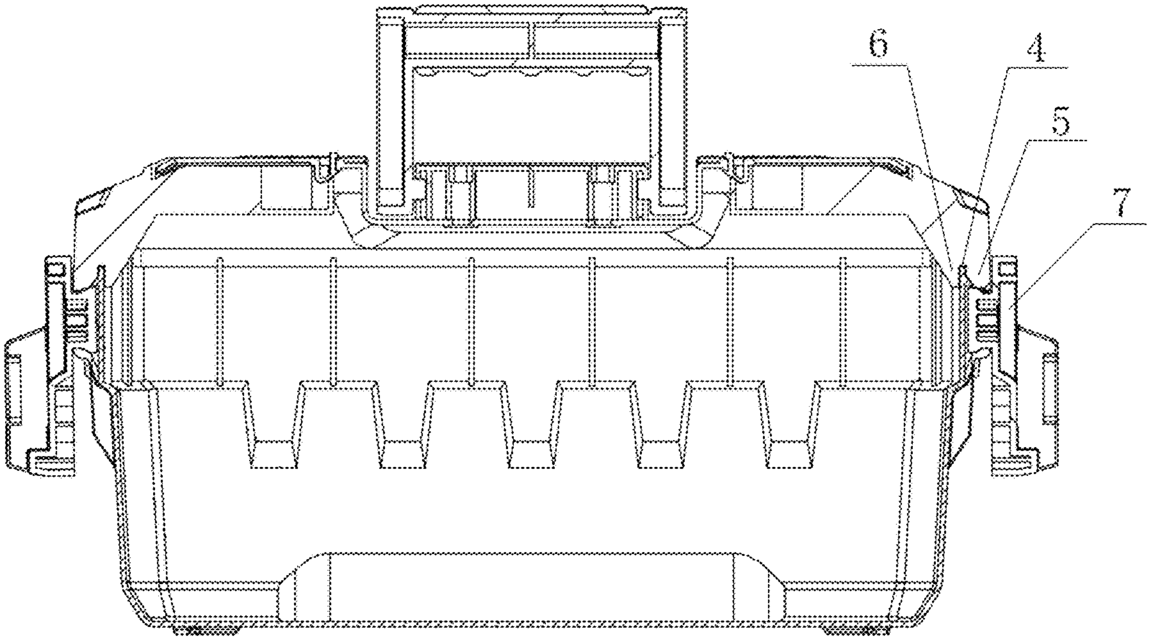
FIG. 5 is a front view of the toolbox with the side hanging function of FIG. 4, wherein the front half of the entire toolbox is conceptually removed by a sectional plane. This sectional plane passes through, on both left and right sides, the anti-detachment T-shaped bar, the anti-deformation T-shaped bar, the elastic jamming tongue, and the side hanging groove, and is substantially perpendicular to a bottom surface of the toolbox.

FIGS. 4 and 5 show application states of the toolbox with the side hanging function. Installing a removable storage pendant 7 in the side hanging groove 3, the shape and size of the removable storage pendant 7 can be designed according to actual needs. During the process of installing the removable storage pendant 7, the elastic jamming tongue 4 may generate deformation and pressed to the inner side of the box body 1. And the elastic jamming tongue 4 may elastic to an original state after the removable storage pendant 7 is installed. The removable storage pendant 7 may stick and fix on the side hanging groove 3. Once the box cover 2 is closed, the anti-detachment T-shaped bar 5 and the anti-deformation T-shaped bar 6 are stuck and pressed on the upper of the side hanging groove 3 and the elastic jamming tongue 4 respectively.

Please refer to FIG. 5, the removable storage pendant 7 inside the side hanging groove 3 is stuck by the anti-detachment T-shaped bar 5 to prevent it from escaping, the elastic jamming tongue 4 is stuck by the anti-deformation T-shaped bar 6 to prevent its deformation. Any items can put or hang on the removable storage pendant 7, especially the items that need to pick up and use at any time and the items that are not suitable for placing in the toolbox, such as electric drill, flashlight, lithium battery, walkie-talkies et al., and it is very convenient.

The above are only some embodiments of the present disclosure, and neither the words nor the drawings can limit the protection scope of the present disclosure. Any equivalent structural transformation made by using the contents of the specification and the drawings of the present disclosure under the overall concept of the present disclosure, or directly/indirectly applied in other related technical fields are included in the protection scope of the present disclosure.

What is claimed is:

1. A toolbox with a side hanging function, the toolbox comprising a box body and a box cover, and further comprises:

a U-shaped side hanging notch, defined in an upper edge of a side wall of the box body, wherein the upper edge of the side wall of the box body is of a double layer structure and comprises an inner layer and an outer layer, the side hanging notch being defined in the outer layer;

an elastic jamming tongue, disposed on an inner side of the side hanging notch and connected to the side wall of the box body, the elastic jamming tongue being matched to the side hanging notch and being located on the inner layer of the side wall of the upper edge of the box body; and an anti-detachment T-shaped bar and an anti-deformation T-shaped bar that are disposed on the box cover; wherein the anti-detachment T-shaped bar is disposed corresponding to the side hanging notch, and the anti-deformation T-shaped bar is disposed corresponding to the elastic jamming tongue;

wherein the side hanging notch is configured to receive a removable storage pendant, wherein during a process of placing the removable storage pendent, the elastic jamming tongue is operative to deform and bias towards an inner side of the box body and return to an original state after the removable storage pendent is held in place; and wherein the box cover is operative to be closed with the box body, in which the anti-detachment T-shaped bar abuts against an upper side of the side hanging notch, and the anti-deformation T-shaped bar abuts against an upper side of the elastic jamming tongue.

* * * * *